United States Patent [19]
Kwaśniak

[11] 3,944,407
[45] Mar. 16, 1976

[54] SEPARATOR FOR GAS DEHUMIDIZATION
[75] Inventor: Jak Kwaśniak, Lodz, Poland
[73] Assignee: Politechnika Lodzka, Lodz, Poland
[22] Filed: Nov. 29, 1974
[21] Appl. No.: 528,563

[30] Foreign Application Priority Data
Dec. 11, 1973 Poland .................................. 167241

[52] U.S. Cl. ..................................... 55/455; 55/463
[51] Int. Cl.² .......................................... B01D 45/12
[58] Field of Search ............. 55/455, 463, 418, 440, 55/218

[56] References Cited
UNITED STATES PATENTS
3,815,339   6/1974   Meir et al. ............................. 55/466

FOREIGN PATENTS OR APPLICATIONS
722,041   6/1942   Germany ................................ 55/455

*Primary Examiner*—Bernard Nozick
*Attorney, Agent, or Firm*—Haseltine, Lake & Waters

[57] ABSTRACT

Apparatus for gas dehumidization especially for gases where the diameters of the droplets are smaller than 10 micrometers. Layers of vertically arranged blades protrude from a tubular surface coaxial with a housing, and are shaped along an involute line with equal pitch. On the blades rests a cover with a cone having its vertex directed towards the gas inlet. A stream of gas to be dehumidified is introduced into the interior of the plant and directed through the cone radially into passages between the blades where due to the momentum transverse to the gas streams, the liquid droplets become separated from the gas.

4 Claims, 2 Drawing Figures

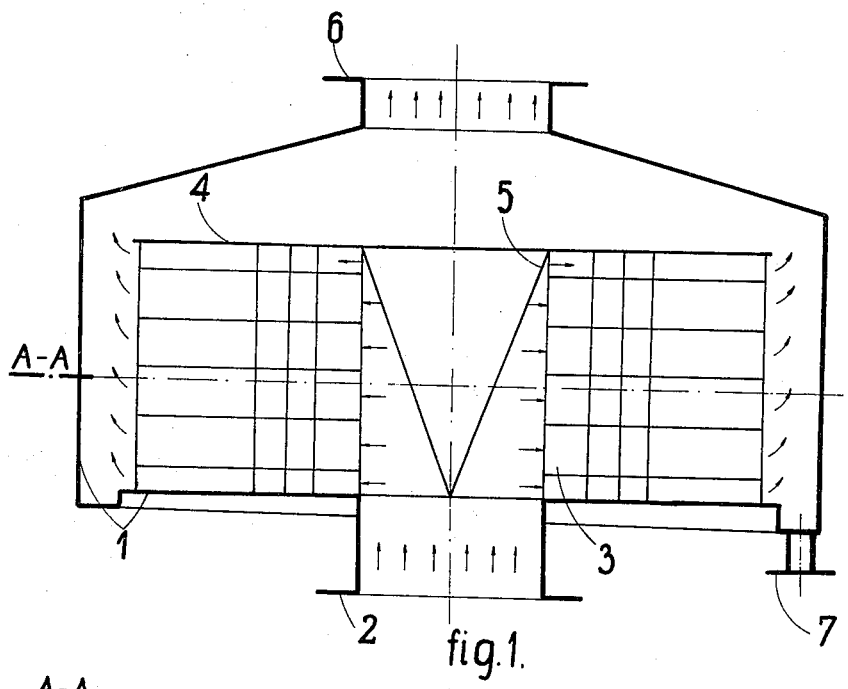
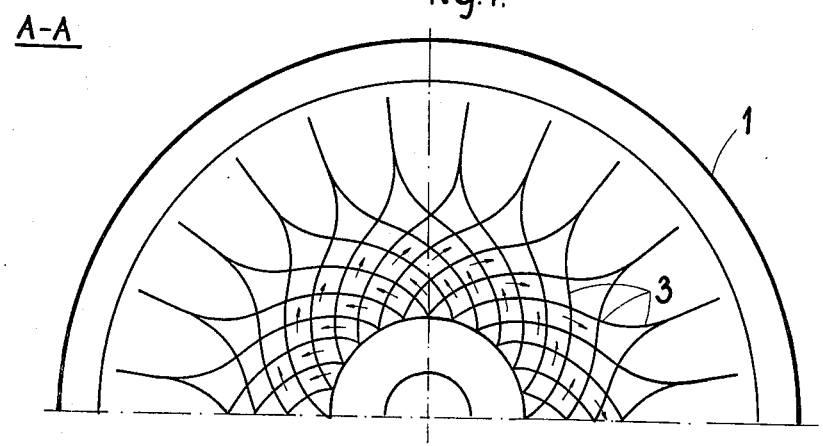

SEPARATOR FOR GAS DEHUMIDIZATION

The subject of this invention is the equipment for dehumidization of gases especially such with drops the diameter of which is less than 10 micrometers.

So far gas dehumidifiers were used in which the operating components was composed of a parallely situated pack of corrugated sheets which were spaced at determined intervalls. In these dehumidifiers occured an alternate curving of gas streams causing that the minute droplets which did not approach the wall of sheet at one curving occupy the most unfavourable position with relation to the next curving of the gas stream thus reducing the efficiency of dehumidization.

There are also known pad dehumidifiers in which gas is being passed through a pack of chips, screens, fibre glass or variously spahed granular profiles. In these dehumidifiers occur severe losses of purified gas.

Other dehumidifiers are composed of packs of parallel tubes equipped at the inlet with vanes which cause the gas stream to swirl; the said swirl is rapidly dwindling due to the friction of gas stream against tube walls.

For the known dehumidifying equipment there exists such value of gas flow velocity at which the fluid is torn off the walls and re-enters in shape of droplets into gas streams which results in reduction of dehumidization efficiency.

The dehumidifier according to invention is equipped with layers of vertically situated blades protruding from a tubular surface, co-axial with the housing and shaped along an involute with equal pitch whereby the blade curving radius of two adjacent layers has an opposite sense. Such situated blades split the gas stream into parallel planes which are further split into streams of equal width by the side edges of blades situated in adjacent planes. Moreover, the gas streams which contact each other in layer dividing planes mutually convey to each other the crosswise momentum and set each other into rotary motion. The centrifugal force, accompanying this motion, pulls the droplets from stream interior and deposits the droplets on blade walls. Setting of gas streams into rotary motion extend the period of influence of inertia forces upon the droplets of liquid thus improving the efficiency of dehumidization.

The subject of this invention is illustrated as an examples on the accompanying drawings where FIG. 1 shows the sheer plan of the equipment and FIG. 2 denotes the cross-section of equipment along A—A line on FIG. 1.

The equipment for gas dehumidization consists of a housing 1, in the bottom of which there is a coaxial gas inlet stub 2. Inside the housing 1, between two tubular surfaces with common geometrical axis, there located packs of vertical blades 3 protruding from the tubular surface, co-axial with the housing 1, shaped along an involute line and spaced with equal pitch. On blades 3 rests the cover 4 with cone 5 the vertex of which points in direction opposite to that of gas inlet. The cone 5 is used to uniformly split the stream of gas to be dehumidified among all the blades 3. At the other end of the housing there is co-axially situated the outlet stub 6 to drain the dehumidified gas, and in the bottom 1 of the housing there is situated the stub 7 for draining the separated liquid.

The equipment operates as follows: The gas stream to be dehumidified passes through inlet stub 2 into the interior of the plant and radially directed by the cone 5 into passages formed among the blades 3 where due to the conveyance of momentum cross-wise among gas streams the droplets of liquid become separated from the gas which is drained via the outlet stub 6 and the liquid is drained via the stub 7.

What we claim is:

1. Apparatus for gas dehumidization comprising a cylindrical housing with a flat bottom having a gas inlet stub pipe, a dehumidifying pack supported by said bottom, said pack having at least two horizontal layers of curved rectangular blades spaced from said housing, a cover having a cone for closing said pack at the top thereof, said blades comprising successive horizontal layers of the pack and being spanned at equal intervals between two concentric vertical imaginary cylindrical surfaces, the lateral edges of the said blades lying on the generating lines of the said surfaces, the longitudinal extent of said blades running along a curve with origin at the inner imaginary cylindrical surface comprising an involute, the other end of the curve at the outer imaginary cylindrical surface running along the radius of the said surface, the curvatures of adjacent layers being in opposite sense, gas outlet means, and liquid outlet means, the base of said cone being mounted to said cover, said cone being directed downwards with vertex opposite to said gas inlet, said cover forming an axially-symmetrical arrangement with said blades and said housing the side surfaces of said blades intersecting said cylindrical surfaces and limit the pack of blades from the outside at substantially a right angle.

2. The apparatus as defined in claim 1 wherein said cylindrical surface associated with said longitudinal edges of said blades limit the pack of said blades from the inside, the cylindrical surface associated with said other end of said curve limiting the pack of blades from the outside.

3. The apparatus as defined in claim 2 wherein the horizontal pattern of each following layer of blades is a mirror reflection of the preceding layer.

4. The apparatus as defined in claim 3 wherein said pack of blades bring separate streams of gas into the rotary motion, said blades having curved clearances therebetween through which said separate streams of gas flow in said pack, each separate stream of gas whirling when flowing through one of said clearances so that droplets of liquid are thrown against the walls of said blades under the effect of centrifugal force, the dehumidization zone being contained within the space confined by said blades of said pack, said pack of blades being spaced from said housing by an annular space forming exclusively a passage through which the dehumidified gas is discharged, said gas streams being free of whirling motion in said annular space, said cover having a circular shape with diameter equal to the diameter of the circle described by the outer vertical edges of said blades.

* * * * *